US007542422B2

(12) United States Patent
Joyce et al.

(10) Patent No.: US 7,542,422 B2
(45) Date of Patent: Jun. 2, 2009

(54) METHOD AND APPARATUS FOR CLASSIFYING VIDEO FLOWS TO MINIMIZE SWITCHING TIME AT A USER TERMINAL

(75) Inventors: Gerald R. Joyce, Newton, MA (US); Christopher W. Brown, Warrington, PA (US); Michael W. Patrick, Assonet, MA (US)

(73) Assignee: General Instrument Corporation, Horsham, PA (US)

( * ) Notice: Subject to any disclaimer, the term of this patent is extended or adjusted under 35 U.S.C. 154(b) by 177 days.

(21) Appl. No.: 11/468,974

(22) Filed: Aug. 31, 2006

(65) Prior Publication Data

US 2008/0056128 A1    Mar. 6, 2008

(51) Int. Cl.
*H04L 12/26* (2006.01)

(52) U.S. Cl. ..................................... 370/235

(58) Field of Classification Search ......... 370/229–235, 370/516, 517; 709/223, 226–228
See application file for complete search history.

(56) References Cited

U.S. PATENT DOCUMENTS

| | | | |
|---|---|---|---|
| 6,665,317 B1 * | 12/2003 | Scott ........................... | 370/516 |
| 6,678,250 B1 * | 1/2004 | Grabelsky et al. ........... | 370/241 |
| 6,684,273 B2 * | 1/2004 | Boulandet et al. ............. | 710/52 |
| 6,862,298 B1 * | 3/2005 | Smith et al. ................... | 370/516 |
| 6,977,905 B1 * | 12/2005 | Shaffer et al. ................ | 370/252 |
| 7,006,511 B2 * | 2/2006 | Lanzafame et al. ......... | 370/412 |
| 7,277,943 B1 * | 10/2007 | Surazski ...................... | 709/226 |
| 7,319,687 B2 * | 1/2008 | Tsutsumi et al. ............ | 370/338 |
| 2003/0031210 A1 * | 2/2003 | Harris ......................... | 370/516 |
| 2005/0237937 A1 * | 10/2005 | Van Gestel .................. | 370/235 |

* cited by examiner

*Primary Examiner*—Dmitry Levitan
(74) *Attorney, Agent, or Firm*—Larry T. Cullen

(57) ABSTRACT

A method and apparatus for classifying video flows to minimize switching time at a user terminal is described. One aspect of the invention relates to classifying video for distribution. A plurality of classes associated with a respective plurality of network jitter measures is established. A jitter profile for a plurality of video flows is defined by associating each video flow of the plurality of video flows with one of the plurality of classes based on an estimated jitter measure of the video flow. The jitter profile is distributed towards at least one user terminal from a distribution facility. The user terminal may use the jitter profile to set the fill level of its jitter buffer dynamically according to the particular video flow being decoded.

24 Claims, 4 Drawing Sheets

METHOD AND APPARATUS FOR CLASSIFYING VIDEO FLOWS TO MINIMIZE SWITCHING TIME AT A USER TERMINAL

BACKGROUND OF THE INVENTION

1. Field of the Invention

The present invention relates generally to video distribution systems and, more particularly, to a method and apparatus for classifying video flows to minimize switching time at a user terminal.

2. Description of the Background Art

Television-based entertainment systems are expanding the programming and services that they offer. In addition to television programming content such as that found on broadcast and traditional cable networks, television service providers are adding on-demand video, as well as other interactive services, features, and applications. The existence of these specific services, features, and applications, as well as the continuing increase in the breadth of available general programming content, drives the adoption of digital network technology for television-based entertainment systems by broadcast, satellite, and traditional cable networks. In addition, such digital network technology is being offered by other forms, such as Internet Protocol Television (IPTV).

IPTV describes a system where a digital television service is delivered to subscribing customers using IP over a broadband connection. Exemplary broadband connections include digital subscriber line (DSL) connections and data-over-cable service interface specification (DOCSIS) cable connections. IPTV service is often provided in conjunction with video on demand (VOD) and may further include Internet services and voice over internet protocol (VOIP) services. In an IPTV system, video flows traverse one or more packet networks before being distributed to clients. Due to variable transmission delays through the packet network(s), individual video flows suffer from variable delays at the client receiving equipment, referred to as "network jitter" or "jitter."

Client receiving equipment (e.g., a set-top box) typically includes jitter compensation logic that buffers an incoming video flow before decoding. At a minimum, the fill level of the buffer must be more than the jitter of the video flow. Presently, since the receiving equipment can select from several video flows (e.g., channels), the receiving equipment sets the buffer fill level high enough to accommodate the largest expected jitter for all possible video flows. Such a high fill level, however, causes the switching time between video flows (channel changing time) to be higher than necessary for those flows that have low jitter. Accordingly, there exists a need in the art for a method and apparatus for minimizing switching time at a user terminal for video flows.

SUMMARY OF THE INVENTION

Method and apparatus for classifying video flows to minimize switching time at a user terminal is described. One aspect of the invention relates to a method of classifying video for distribution. A plurality of classes associated with a respective plurality of network jitter measures is established. A jitter profile for a plurality of video flows is defined by associating each video flow of the plurality of video flows with one of the plurality of classes based on an estimated jitter measure of the video flow. The jitter profile is distributed towards at least one user terminal from a distribution facility. The user terminal may use the jitter profile to set the fill level of its jitter buffer dynamically according to the particular video flow being decoded.

Another aspect of the invention relates to an apparatus for classifying video for distribution. Control logic is provided to establish a plurality of classes associated with a respective plurality of network jitter measures. The control logic defines a jitter profile for a plurality of video flows by associating each video flow with one of the plurality of classes based on an estimated jitter measure of the video flow. A distribution facility is provided to distribute the jitter profile towards at least one user terminal.

Another aspect of the invention relates to a method of processing video from a distribution facility. A jitter profile for a plurality of video flows is received from the distribution facility. The jitter profile associates each video flow of the plurality of video flows with a class of a plurality of classes based on an estimated jitter measure of the video flow. A video flow of the plurality of video flows is selected for decoding. A fill level of a jitter buffer for the selected video flow is determined using the jitter profile.

Another aspect of the invention relates to an apparatus for processing video from a distribution facility. An input/output interface is configured to receive a jitter profile for a plurality of video flows from the distribution facility. The jitter profile associates each video flow of the plurality of video flows with a class of a plurality of classes based on an estimated jitter measure of the video flow. A decoder is provided having a jitter buffer. Control logic is configured to select a video flow of the plurality of video flows for decoding by the decoder and determine a fill level of the jitter buffer for the video flow as selected using the jitter profile.

The jitter profile of the invention allows a user terminal to know how to configure the fill level of its jitter buffer. Thus, the "channel changing" time between video flows will depend on the class of video flow being selected at the user terminal. By controlling which flows are in which jitter classes, the a network operator will have the opportunity to minimize the channel changing time for selected flows, and will be able to control which flows exhibit minimal channel changing times. The viewer will have a superior experience when selecting video flows in lower jitter classes. There will be a natural preference for subscribers to select "low jitter" flows, such flows being designated as such by the network operator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
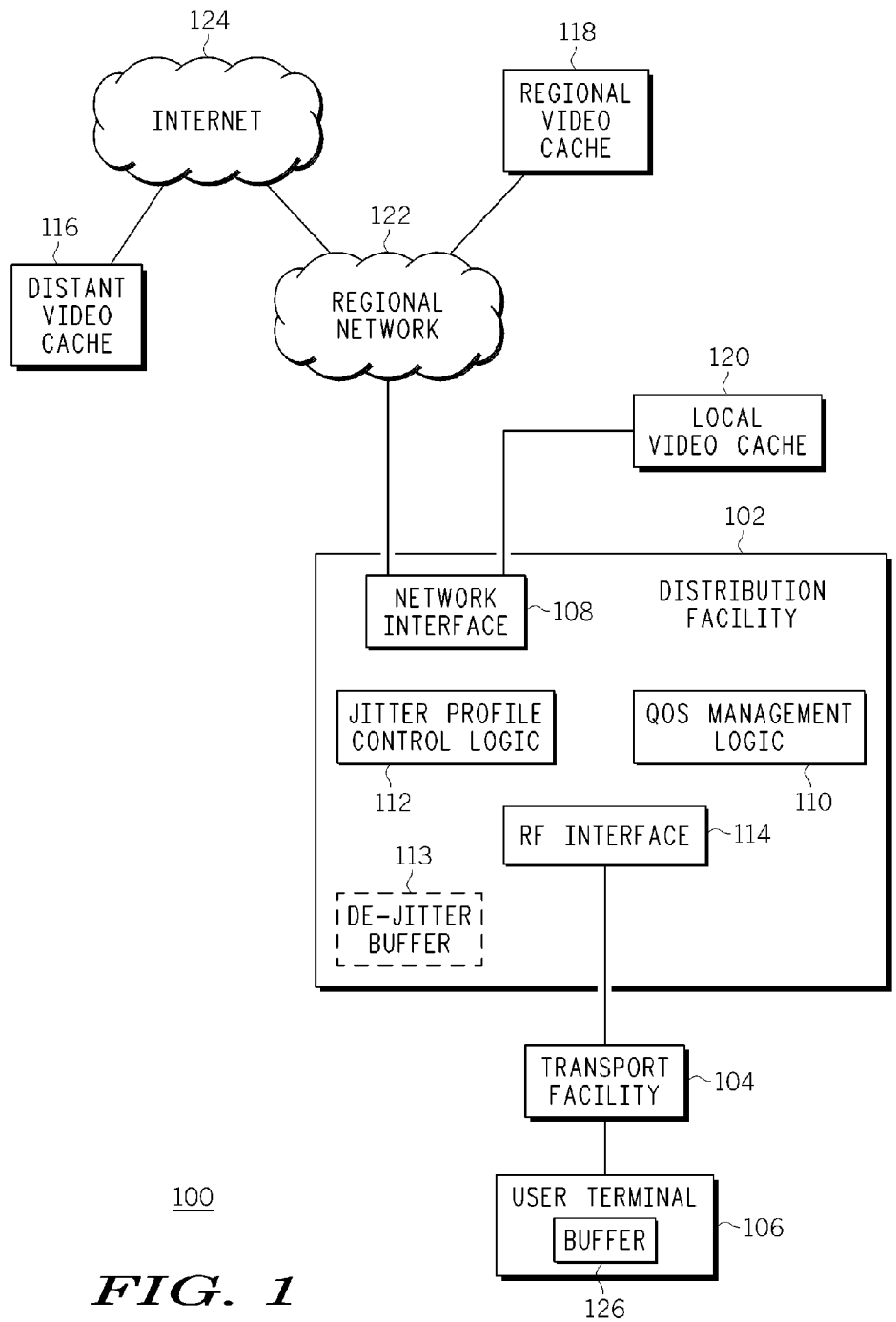
FIG. 1 is a block diagram depicting an exemplary embodiment of a video distribution system in accordance with one or more aspects of the invention.

FIG. 1 is a block diagram depicting an exemplary embodiment of a video distribution system 100 in accordance with one or more aspects of the invention. The system 100 includes a distribution facility 102, a transport facility 104, and a user terminal 106. The distribution facility 102 includes a network interface 108, quality of service (QoS) management logic 110, jitter profile control logic 112, and communication interface 114. The distribution facility 102 may be, for example, a headend or a hub for distributing video to user terminals. The network interface 108, QoS management logic 110, jitter profile control logic 112, and communication interface 114 are implemented using various types of network elements, such as routers, switches, servers, modulators, and the like.

The distribution facility 102 obtains video flows from various sources via the network interface 108. The network interface 108 may comprise an Ethernet interface or other type of data link layer interface known in the art. Illustrative video sources include a distant video cache 116, a regional video cache 118, and a local video cache 120. A video flow includes one or more streams of video data. Video, as used herein, may optionally include audio and/or associated audio/video presentation control information. The local video cache 120 is coupled directly to the network interface 108. The regional video cache 118 is coupled to the network interface 108 through a regional network 122. The distant video cache 116 is coupled to the network interface 108 through a wide area network (WAN) 124, illustratively the Internet, and the regional network 122. The regional network 122 and the WAN 124 comprise packet networks. A packet network is broadly defined as a network that uses a network protocol, such as Internet Protocol (IP), to exchange data packets.

The communication interface 114 is configured to format the video flows received at the network interface 108 for transmission towards the user terminal 106 via the transport facility 104. The transport facility 104 may comprise a hybrid fiber coaxial (HFC) plant, twisted conductor pair network, or like type transport facility known in the art. The communication interface 114 coverts the packetized video flows for transmission through the transport facility 104. For example, the communication interface 114 converts the packetized video flows for DOCSIS transmission through an HFC plant or DSL transmission through a twisted pair network. The user terminal 106 is coupled to the transport facility 104 and is configured to receive and process video flows provided by the distribution facility 102. The user terminal 106 includes a jitter buffer 126 that is used to compensate for network jitter in the video flows.

The QoS management logic 110 manages a QoS configuration for the distribution facility 102. The QoS management logic 110 maps the video flows to various QoS levels. The distribution facility 102 schedules the video flows for transmission by the communication interface 114 according to policies associated with each QoS level. For example, the distribution facility 102 may perform filtering, packet dropping, rate shaping, and the like to implement QoS policies. In one embodiment, the QoS configuration includes a plurality of priority levels. Each video flow is assigned a particular priority level (e.g., highest priority, medium priority, and low priority). The QoS policies are configured to favor higher priority video flows over lower priority video flows.

The jitter profile control logic 112 is configured to define a jitter profile for the video flows for use by the user terminal 106. The jitter profile control logic 112 establishes a plurality of classes, each class being associated with a different measure of network jitter. Each video flow is classified into one of the classes based on an estimated jitter measure for the flow. The jitter profile includes the classifications of all of the video flows. The jitter profile control logic 112 distributes the jitter profile towards the user terminal 106. The jitter profile control logic 112 transmits the data conveying the jitter profile over the transport facility 104 to the user terminal 106.

In one embodiment, the estimated jitter measure for each video flow is based on source location, network architecture, or QoS configuration, or any combination of such factors. For example, an estimated jitter measure may be based on whether the video flow originates from a local source (e.g., the local video cache 120) or a remote source (e.g., the regional video cache 118 or the distant video cache 116). An estimated jitter measure may be based on whether the video flow traverses a local network (e.g., the direct connection between the local video cache 120 and the network interface 108), a regional network (e.g., the regional network 122), or a distant network (e.g., the Internet). An estimated jitter measure may be based on priority level in the QoS configuration maintained by QoS management logic 110. An estimated jitter measure may be based on any combination of such factors.

For example, video flows from the local video cache 120 only have to traverse the network interface 108. The QoS management logic 110 may give such video flows highest priority. Thus, video flows originating in the local video cache 120 may have negligible jitter upon reaching the user terminal 106 (e.g., less than 5 milliseconds (ms)). Video flows from the regional video cache 116 have to traverse the regional network 122, which causes more jitter. The QoS management logic 110 may give such video flows lower priority. Thus, video flows originating from the regional video cache 116 may have intermediate jitter (e.g., 40 ms or less). Video flows from the distant video cache 116 have to traverse the Internet 124 and the regional network 122. The QoS management logic 110 may give such video flows lowest priority. Thus, the video flows originating from the distant video cache 116 may have high jitter (e.g., greater than 40 ms). The above-described jitter classifications are merely exemplary. Although three classifications are described, it is to be understood that more or less jitter classifications may be employed.

In the above example, it is assumed that the QoS management logic 110 assigns highest priority to lowest jitter flows and lowest priority to highest jitter flows. In the present embodiment, however, this is not a necessary requirement. The QoS management logic 110 operates independently from the jitter classification process. For example, a video flow originating from the regional video cache 116 may be deemed sufficiently important to warrant a high priority assignment by the QoS management logic 110. The jitter profile control logic 112 may determine the estimated measure of jitter for a given video flow based on a totality of the aforementioned factors (e.g., source location, network architecture, and QoS configuration).

In another embodiment, jitter classification of the video flows is tied to the QoS configuration. That is, the QoS management logic 110 controls the jitter classification of video flows by assigning the flows particular priorities. The QoS management logic 110 assigns video flows with higher jitter a lower priority, and video flows with lower jitter a higher priority. In one embodiment, the QoS management logic 110 configures each video flow to have one of a plurality of priorities based on source location and/or network architecture. For example, a priority may be based on whether the video flow originates from a local source (e.g., the local video cache 120) or a remote source (e.g., the regional video cache 118 or the distant video cache 116). Priority may be based on whether the video flow traverses a local network (e.g., the direct connection between the local video cache 120 and the network interface 108), a regional network (e.g., the regional network 122), or a distant network (e.g., the Internet). Priority may be based on a combination of such factors.

The jitter profile control logic 112 classifies each video flow into one of the jitter classes based on an estimated jitter measure for the flow at its arrival at the user terminal 106. The estimated jitter measure for each video flow is based on the jitter of that flow at its arrival at the distribution facility 102 and on the priority assigned to each video flow by the QoS management logic 110. The jitter profile control logic 112 defines a jitter profile for the video flows from the classifications for use by the user terminal 106.

In either embodiment, the user terminal 106 uses the jitter profile to set the fill level of the buffer 126 when decoding particular video flows. Each jitter class is associated with a particular fill level. The associations between jitter class and fill level may be provisioned in the user terminal 106. Alternatively, the jitter profile control logic 112 may include fill levels for the jitter classes in the jitter profile.

In one embodiment, the user terminal 106 downloads the jitter profile for all available video flows. This downloading may occur at the initiative of either the distribution facility 102 or the user terminal 106. That is, the jitter profile control logic 112 sends a jitter profile having data for all available video flows to the user terminal 106 either on its own initiative or in response to a request from the user terminal 106. In another embodiment, jitter profile data for a particular video flow is sent to the user terminal 106 when the user terminal 106 selects the video flow. Thus, upon selecting a video flow at the user terminal 106, the jitter profile control logic 112 sends jitter profile data for only the selected video flow. The jitter profile may be sent in a "burst of information" prior to distribution of the video flow from the distribution facility 102.

In another embodiment, the distribution facility 102 optionally includes a de-jittering buffer 113. The de-jittering buffer 113 may be used to reduce the jitter in selected video flows. For example, the de-jittering buffer 113 may be used to reduce jitter in video flows that have originated from either the regional video cache 118 or the distant video cache 116. The de-jittering buffer 113 may be used to reduce jitter in video flows that arrive at the distribution facility with intermediate or high jitter. The video flows exit the distribution facility 102 with lower jitter than when such video flows were received.

Figure 2:
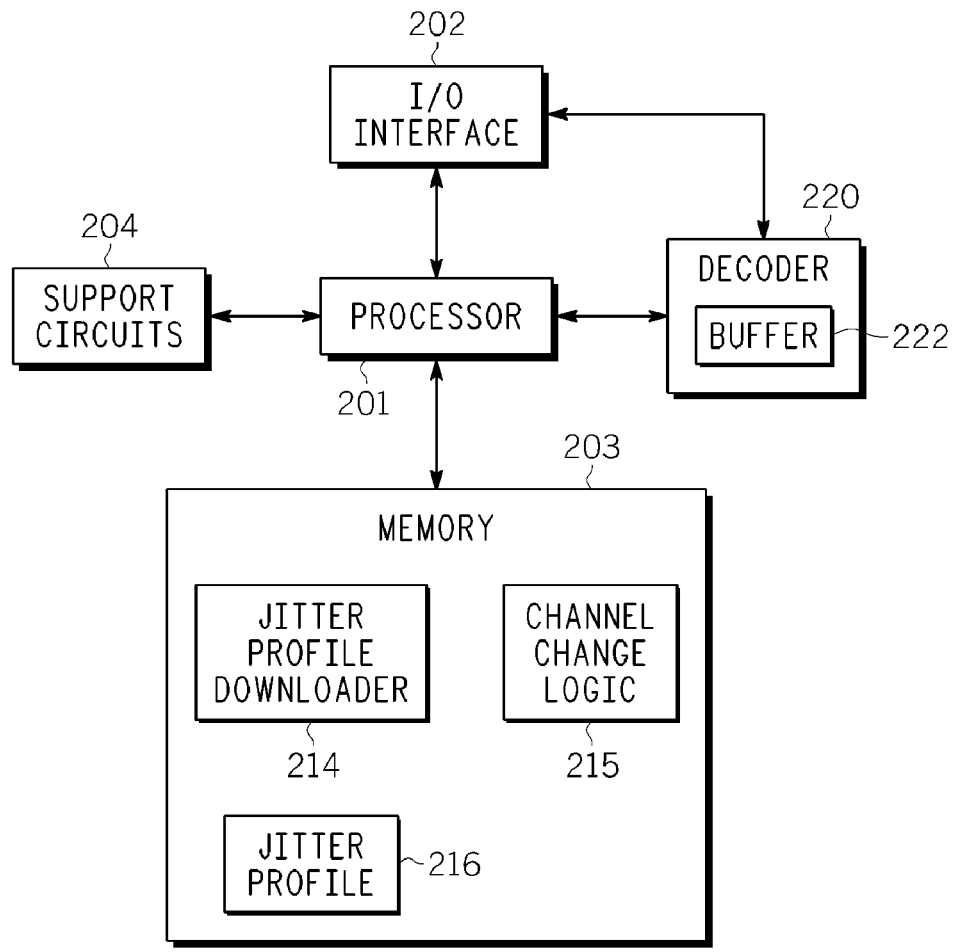
FIG. 2 is a block diagram depicting an exemplary embodiment of a user terminal constructed in accordance with one or more aspects of the invention.

FIG. 2 is a block diagram depicting an exemplary embodiment of the user terminal 106 constructed in accordance with one or more aspects of the invention. The user terminal 106 includes a processor 201, a memory 203, various support circuits 204, an I/O interface 202, and a decoder 220. The processor 201 may be any type of microprocessor known in the art. The support circuits 204 for the processor(s) 201 include conventional cache, power supplies, clock circuits, data registers, I/O interfaces, and the like. The I/O interface 202 may be directly coupled to the memory 203 or coupled through the processor 201. The I/O interface 202 may be coupled to the transport facility 104 for receiving video flows and jitter profiles from the distribution facility 102. The processor 201 is coupled to the decoder 220. The decoder 220 includes a buffer 222 for jitter compensation. In this illustrative embodiment, the processor 201 and the memory 203 comprise control logic for the user terminal 106.

The memory 203 stores processor-executable instructions and/or data that may be executed by and/or used by the processor(s) 201 as described further below. These processor-executable instructions may comprise hardware, firmware, software, and the like, or some combination thereof. Modules having processor-executable instructions that are stored in the memory 203 include jitter profile downloader 214 and channel change logic 215. Data stored in the memory 203 includes jitter profile 216. The memory 203 may include one or more of the following random access memory, read only memory, magneto-resistive read/write memory, optical read/write memory, cache memory, magnetic read/write memory, and the like, as well as computer readable media as described below.

Although the control logic of the user terminal 106 is disclosed as having a processor executing a software program stored in a memory, those skilled in the art will appreciate that the control logic of the user terminal 106 may be implemented in hardware, software, or a combination of hardware and software. Such implementations may include a number of processors independently executing various programs and dedicated hardware, such as application specific integrated circuits (ASICs).

In one embodiment, the jitter profile downloader 214 is configured to cause the user terminal 106 to receive the jitter profile 216 for a plurality of video flows from the distribution facility 102. As described above, the jitter profile 216 associates each video flow with a jitter class based on an estimated jitter measure. The channel change logic 215 is configured to cause the decoder 220 to begin decoding a particular video flow. A user may use channels to select among the video flows. In response to a channel change request, the channel change logic 215 obtains the jitter class for the requested video flow from the jitter profile 216. The channel change logic 215 informs the decoder 220 of the jitter class for the requested channel. The decoder 220 sets the fill level of the buffer 222 according to the jitter class and begins decoding the requested video flow. Alternatively, the channel change logic 215 may inform the decoder 220 of the fill level for the buffer 222 based on the jitter class.

The fill level of the buffer 222 is determined based on the jitter measure of the jitter class associated with the selected video flow. For example, the jitter profile 216 may define three classes of jitter: negligible jitter (e.g., less than 5 ms); intermediate jitter (e.g., less than 40 ms); and high jitter (e.g., more than 40 ms). The fill levels for the buffer 222 associated with the different jitter classes are design parameters. At a minimum, the fill level of the buffer 222 must be higher than the jitter. Other factors include sufficient fill level to derive timing, to contain enough intra-coded (I) and or predictive coded (P) frames to decide bi-directionally predicted (B) frames, and the like. In any case, the particular fill level for each defined class may be provisioned with the user terminal 106 or provided as part of the jitter profile 216.

In another embodiment, the jitter profile downloader 214 is not configured to download the jitter profile for all available video flows. Rather, the jitter profile downloader 214 is configured to receive a jitter profile only for the currently selected video channel. For example, the jitter profile downloader 214 may receive an indication from the channel change logic 215 as to the currently selected channel. In response, the jitter profile downloader 214 requests and receives the jitter profile for the selected channel. Alternatively, the jitter profile downloader 214 may receive the jitter profile for the selected channel automatically from the distribution facility in response to selection of the video flow.

Figure 3:
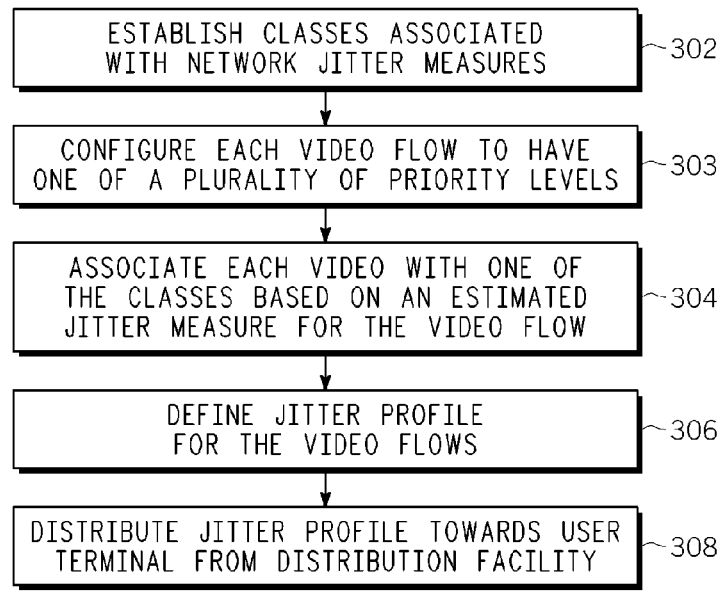
FIG. 3 is a flow diagram depicting an exemplary embodiment of a method of classifying video for distribution in accordance with one or more aspects of the invention.

FIG. 3 is a flow diagram depicting an exemplary embodiment of a method 300 of classifying video flows for distribution in accordance with one or more aspects of the invention. The method 300 begins at step 302, where a plurality of classes associated with a respective plurality of network jitter measures is established. At step 304, each of a plurality of video flows is associated with one of the classes based on an estimated jitter measure for the video flow. The estimated jitter measure for each video flow may be based on source location, network architecture, or QoS configuration, or any combination of such factors. Alternatively, at optional step 303, each of the video flows may be configured to have one of a plurality of priority levels. The priority levels are part of a QoS configuration. Then, at step 304, the estimated jitter measure for each video flow may be based on priority level in the QoS configuration. In either case, at step 306, a jitter profile is defined for the classified video flows. At step 308, the jitter profile is distributed towards at least one user terminal from a distribution facility.

Figure 4:
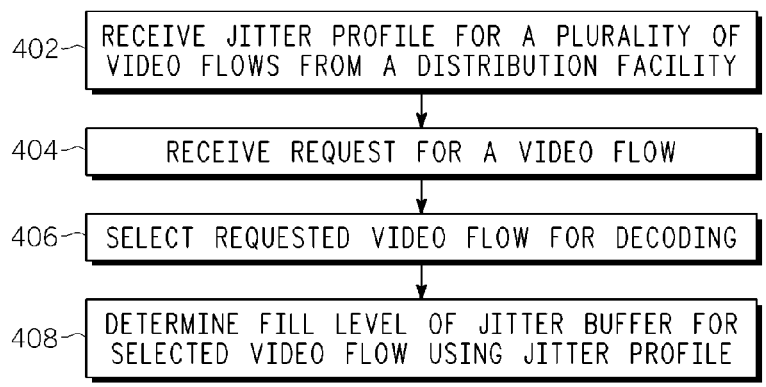
FIG. 4 is a flow diagram depicting an exemplary embodiment of a method for processing video from a distribution facility in accordance with one or more aspects of the invention.

FIG. 4 is a flow diagram depicting an exemplary embodiment of a method 400 for processing video from a distribution facility in accordance with one or more aspects of the invention. The method 400 begins at step 402, where a jitter profile for a plurality of video flows is received from a distribution facility. The jitter profile associates each video flow with one of a plurality of classes based on an estimated jitter measure of the video flow. At step 404, a request for a video flow is received. The request may comprise a channel change request, for example. At step 406, the requested video flow is selected for decoding. At step 408, a fill level of a jitter buffer for the selected video flow is determined using the jitter profile. The fill level is determined according to the jitter measure of the class associated with the selected video flow.

Figure 5:
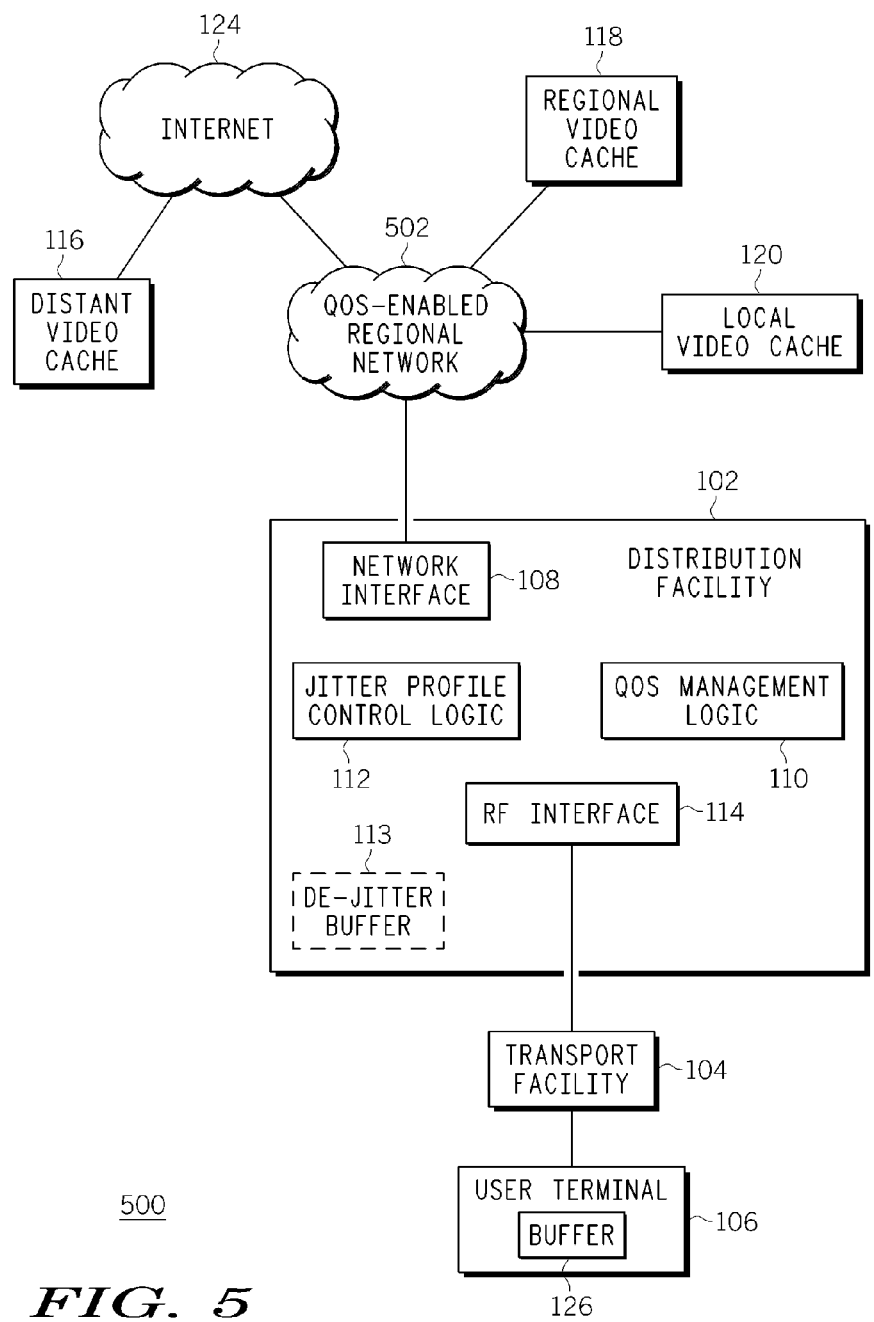
FIG. 5 is a block diagram depicting another exemplary embodiment of a video distribution system in accordance with one or more aspects of the invention.

FIG. 5 is a block diagram depicting another exemplary embodiment of a video distribution system 100 in accordance with one or more aspects of the invention. Elements of FIG. 5 that are same or similar to those of FIG. 1 are designated with identical reference numerals and are described in detail above. In the present embodiment, the video distribution system 100 includes a QoS-enabled regional network 502. The QoS-enabled regional network 502 is coupled to the Internet 124, the regional video cache 118, and the local video cache 120. Notably, the local video cache 120 is coupled to the QoS-enabled regional network 502, rather than directly to the network interface 108 as in the embodiment of FIG. 1.

For example, the QoS-enabled regional network 122 and the regional video cache 118 may be under control of the operator of the distribution facility 102 (e.g., multiple systems operator (MSO)). The QoS-enabled regional network 122 is QoS enabled such that video flows originating from the local video cache 120 are given higher priority through the network 122 than video flows originating from the regional video cache 118. Thus, video flows originating from the local video cache 120 still have lower jitter than those originating from the regional video cache 118.

The processes described herein may be implemented in hard wired devices, firmware, or software running in a processor. Any of such processes may be contained on a computer readable medium that may be read by processor(s). A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals, and the like.

Method and apparatus for classifying video flows to minimize switching time at a user terminal. In one embodiment, IP video flows are divided into classes with differing amounts of network jitter. The distribution facility uses QoS in its network to control which flows will be in the lower or higher jitter classes. User terminals include intelligence configured to download jitter profiles for IP video flows in order to determine which flows are in which classes with respect to jitter. In switching to a new video flow, the user terminal knows how to configure the fill level for the jitter buffer based on the jitter profile. Thus, the "channel changing" time will depend on the class of the flow being selected at the user terminal. By controlling which flows are in which jitter classes, the distribution facility will have the opportunity to minimize the channel changing time for those flows, and will be able to control which flows exhibit minimal channel changing times. The viewer will have a superior experience when selecting video flows in lower jitter classes. There will be a natural preference for subscribers to select "low jitter" flows, such flows being designated as such by the distribution facility (e.g., MSO).

While various embodiments have been described above, it should be understood that they are presented by way of example only, and not limiting. For example, although the invention disclosed herein was discussed in connection with IP-based VOD services in the exemplary embodiments, one skilled in the art would recognize that the method and system disclosed herein can also be used in connection with other forms of communication, such as broadcast over IP Multicast or wireless services. Thus, the breadth and scope of a preferred embodiment should not be limited by any of the above-described exemplary embodiments, but should be defined only in accordance with the following claims and their equivalents.

What is claimed is:

1. A method of classifying video for distribution, comprising:
   establishing, at a distribution facility, a plurality of classes associated with a respective plurality of network jitter measures;
   defining, at the distribution facility, a jitter profile for at least one video flow by associating each video flow of the at least one video flow with one of the plurality of classes based on an estimated jitter measure of the video flow; and
   distributing the jitter profile towards at least one user terminal from the distribution facility.

2. The method of claim 1, wherein the estimated jitter measure for each of the at least one video flow is based on at least one of: a location of video flow source, a network architecture, previous video jitter data collected on a network, or a quality of service (QoS) configuration of the distribution facility.

3. The method of claim 1, wherein the estimated jitter measure for each of the at least one video flow is based on at least one of: (a) whether the video flow originates from a local source or a remote source; (b) whether the video flow traverses local, regional, or distant portions of a network architecture; or (c) a priority level in a quality of service (QoS) configuration for the distribution facility.

4. The method of claim 1, wherein the estimated jitter measure for each of the at least one video flow is based on a priority level of a plurality of priority levels in a quality of service (QoS) configuration of the video flow, and wherein the method further comprises:

configuring each of the at least one video flow to have one of the plurality of priority levels.

5. The method of claim 4, wherein each of the at least one video flow is configured to have one of the plurality of priority levels based on at least one of: a location of video flow source or a network architecture of the distribution facility.

6. The method of claim 4, wherein each of the at least one video flow is configured to have one of the plurality of priority levels based on at least one of: (a) whether the video flow originates from a local source or a remote source; or (b) whether the video flow traverses local, regional, or distant portions of a network architecture of the distribution facility.

7. The method of claim 1, wherein the jitter profile is configured to be used by the at least one user terminal for determining a fill level of a jitter buffer.

8. The method of claim 1, wherein the at least one user terminal comprises a first user terminal, and where the jitter profile is distributed from the distribution facility towards the first user terminal in response to a request for a video flow.

9. The method of claim 8, wherein the jitter profile distributed from the distribution facility to the first user terminal only includes a jitter measure for the requested video flow.

10. A distribution facility for classifying video for distribution, the distribution facility comprising:

control logic configured to establish a plurality of classes associated with a respective plurality of network jitter measures and define a jitter profile for at least one video flow by associating each video flow of the at least one video flow with one of the plurality of classes based on an estimated jitter measure of the video flow; and the control logic further configured to distribute the jitter profile towards at least one user terminal.

11. The distribution facility of claim 10, wherein the estimated jitter measure for each of the at least one video flow is based on at least one of: a location of video flow source, a network architecture, previous video jitter data collected on the network, or a quality of service (QoS) configuration of the distribution facility.

12. The distribution facility of claim 10, wherein the estimated jitter measure for each of the at least one video flow is based on at least one of: (a) whether the video flow originates from a local source or a remote source; (b) whether the video flow traverses local, regional, or distant portions of a network architecture of the distribution facility; or (c) a priority level in a quality of service (QoS) configuration for the distribution facility.

13. The distribution facility of claim 10, wherein the estimated jitter measure for each video flow of the at least one video flow is based on a priority level of a plurality of priority levels in a quality of service (QoS) configuration of the video flow, and wherein the controller apparatus further comprises:

a QoS management logic for configuring each of the at least one video flow to have one of the plurality of priority levels.

14. The distribution facility of claim 13, wherein each of the at least one video flow is configured to have one of the plurality of priority levels based on at least one of: a location of video flow source or a network architecture of the distribution facility.

15. The distribution facility of claim 13, wherein each of the at least one video flow is configured to have one of the plurality of priority levels based on at least one of: (a) whether the video flow originates from a local source or a remote source; or (b) whether the video flow traverses local, regional, or distant portions of a network architecture of the distribution facility.

16. The distribution facility of claim 10, wherein the jitter profile is configured to be used by the at least one user terminal for determining a fill level of a jitter buffer.

17. The distribution facility of claim 10, wherein the at least one user terminal comprises a first user terminal, and where the control logic is configured to distribute the jitter profile towards the first user terminal in response to a request for a video flow.

18. The distribution facility of claim 17, wherein the jitter profile distributed to the first user terminal only includes a jitter measure for the requested video flow.

19. A method of processing video from a distribution facility, comprising:

receiving a jitter profile for at least one video flow from the distribution facility, the jitter profile associating each video flow of the at least one video flow with a class of a plurality of classes based on an estimated jitter measure of the video flow;

selecting a video flow of the at least one video flow for decoding; and determining a fill level of a jitter buffer for the video flow as selected using the jitter profile.

20. The method of claim 19, wherein each of the plurality of classes is associated with a jitter measure, and wherein the fill level of the jitter buffer is determined in response to the jitter measure of the class associated with the video flow as selected.

21. The method of claim 19, wherein the at least one video flow is associated with a respective plurality of channels and the step of selecting is performed in response to channel change.

22. Apparatus for processing video from a distribution facility, comprising:

an input/output interface configured to receive a jitter profile for at least one video flow from the distribution facility, the jitter profile associating each video flow of the at least one video flow with a class of a plurality of classes based on an estimated jitter measure of the video flow;

a decoder having a jitter buffer; and control logic configured to select a video flow of the at least one video flow for decoding by the decoder and determine a fill level of the jitter buffer for the video flow as selected using the jitter profile.

23. The apparatus of claim 22, wherein each of the plurality of classes is associated with a jitter measure, and wherein the control logic determines the fill level of the jitter buffer in response to the jitter measure of the class associated with the video flow as selected.

24. The apparatus of claim 22, wherein the at least one video flow is associated with a respective plurality of channels and the control logic is configured to select the video flow in response to channel change.

* * * * *